UNITED STATES PATENT OFFICE.

CARL V. PETRAEUS, OF PHILADELPHIA, PENNSYLVANIA.

IMPROVEMENT IN PROCESSES FOR MANUFACTURING ALUMINA AND CARBONATE OF SODA.

Specification forming part of Letters Patent No. 222,152, dated December 2, 1879; application filed September 30, 1879.

*To all whom it may concern:*

Be it known that I, CARL VALDEMAR PETRAEUS, of Philadelphia, State of Pennsylvania, have invented a new and useful Process of Manufacturing Alumina and Carbonate of Soda from the Minerals known as "Bauxite" and "Cryolite," of which the following description is sufficient to enable those skilled in the art to which my invention appertains to practice the same.

Hitherto, in the manufacture of soda and alumina from bauxite and cryolite, it has been usual to mix lime with said bauxite and cryolite, and to treat the mixture in a furnace. In that case, however, the silica, invariably present in the bauxite, combines with alumina and forms insoluble compounds. Further, the oxide of iron of the bauxite combines with soda and prevents the soda from dissolving a part of the alumina.

To obviate these difficulties is the object of my invention.

In my process I proceed as follows: I mix with crushed cryolite caustic lime, and roast the mixture in an ordinary cryolite or other suitable furnace. The roasted mass is then drawn from the furnace and mixed with crushed bauxite, and the whole boiled in water. In this way the hydrated alumina of the bauxite is dissolved by the neutral aluminate of soda, and an acid aluminate of soda is formed. This product, in solution, is separated by decantation or filtration from the sediment, (fluoride of calcium and other impurities.) I then treat this solution of acid aluminate of soda with carbonic-acid gas by forcing the gas through the solution, whereby is precipitated hydrated alumina, while the carbonate of soda remains in solution.

I have found that the following proportions of material may be employed in said process, viz: one hundred parts of cryolite, one hundred and twenty-five parts of lime slaked to dry powder, and ten parts of bauxite of sixty-five per cent. alumina. These proportions, however, are not essential, and may be departed from without changing the nature of my invention.

The alumina may be collected on a filtrum, or by other means, and the solution of carbonate of soda may be evaporated down to soda-ash or crystal soda, or may be changed into caustic soda.

Having thus described my invention, I claim and desire to secure by Letters Patent of the United States—

The process of manufacturing hydrated alumina and carbonate of soda from cryolite and bauxite, which consists in roasting together crushed cryolite and caustic lime, adding to the mixture divided bauxite, and boiling the compound in water, and treating the solution formed with carbonic-acid gas, substantially as described.

In testimony whereof I have hereunto signed my name this 25th day of September, A. D. 1879.

CARL V. PETRAEUS.

In presence of—
J. BONSALL TAYLOR,
W. C. STRAWBRIDGE.